(12) United States Patent
Ohama

(10) Patent No.: US 7,160,206 B2
(45) Date of Patent: Jan. 9, 2007

(54) GOLF BALL AND METHOD OF MANUFACTURING THE SAME

(75) Inventor: Keiji Ohama, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 10/874,217

(22) Filed: Jun. 24, 2004

(65) Prior Publication Data

US 2004/0266557 A1 Dec. 30, 2004

(30) Foreign Application Priority Data

Jun. 26, 2003 (JP) ............... 2003-182217

(51) Int. Cl.
*A63B 37/00* (2006.01)
(52) U.S. Cl. .................................. 473/351
(58) Field of Classification Search ........... 473/351, 473/367, 368
See application file for complete search history.

(56) References Cited

U.S. PATENT DOCUMENTS

2002/0065148 A1* 5/2002 Yokota et al. ............. 473/367
2002/0103042 A1* 8/2002 Yokota ...................... 473/367
2003/0073784 A1 4/2003 Ohama

FOREIGN PATENT DOCUMENTS

JP 2002-159595 A 6/2002

OTHER PUBLICATIONS

Sulfur definition from Wikipedia.com.*

* cited by examiner

*Primary Examiner*—Raeann Gorden
(74) *Attorney, Agent, or Firm*—Birch, Stewart, Kolasch & Birch, LLP

(57) ABSTRACT

A golf ball with favorable rebound and flight performances without impairing durability, and a method of manufacturing the same are provided. There are provided a golf ball having a solid core and a cover surrounding the solid core, characterized in that the solid core is composed of a vulcanizate of a rubber composition containing a microcapsule having sulfur coated with a thermoplastic resin, and a method of manufacturing the same. A blended amount of the sulfur in the microcapsule form is preferably 0.01–10 parts by mass with respect to 100 parts by mass of a rubber component.

10 Claims, No Drawings

GOLF BALL AND METHOD OF MANUFACTURING THE SAME

This nonprovisional application is based on Japanese Patent Application No. 2003-182217 filed with the Japan Patent Office on Jun. 26, 2003, the entire contents of which are hereby incorporated by reference.

BACKGROUND OF THE INVENTION

1. Field of the Invention

The present invention relates to a golf ball, and more particularly, to a solid golf ball with improved durability and flight performance, and a method of manufacturing the same.

2. Description of the Background Art

For a golf ball, hit feeling and flight performance thereof has conventionally been improved by setting the hardness of a core body, namely, the interior of a solid core, within a proper range. In order to provide favorable, in other words, soft hit feeling, a technique to particularly reduce the hardness of the solid core's center portion to increase a difference between the solid core's center hardness and surface hardness is most effectively used. It has been found that providing a large hardness difference in the solid core increases the amount of deformation upon hitting and thus a struck-out speed is increased with a decreased spin rate, resulting in improved flight performance.

In U.S. Publication No. US 2003/0073784 A1, for example, as a technique to reduce the solid core's center hardness without reducing the solid core's surface hardness so as to improve hit feeling without impairing durability and flight performance, a technique to add 0.01–0.5 parts by weight of sulfur and 0.05–5 parts by weight of an organic sulfur compound with respect to 100 parts by weight of a rubber component in a rubber composition of the solid core is proposed.

The technique in U.S. Publication No. US 2003/0073784 A1 aims to reduce the solid core's center hardness by a highly flexible crosslinking structure formed by the sulfur to ensure flight performance.

With the technique, it is possible to provide a large difference between the solid core's center hardness and surface hardness. However, the crosslinking temperature must be controlled precisely to set a crosslink density within a desired range, which sometimes makes it difficult to produce a desired rubber composition.

SUMMARY OF THE INVENTION

An object of the present invention is to solve the problems above and easily control the solid core's center hardness and surface hardness to be within a desired range so as to provide a golf ball with improved flight performance without impairing durability.

The present invention relates to a golf ball having a solid core and a cover surrounding the solid core, characterized in that the solid core is composed of a vulcanizate of a rubber composition containing a microcapsule having sulfur coated with a thermoplastic resin. The sulfur in the microcapsule form in the rubber composition preferably has a content of 0.01–10 parts by mass with respect to 100 parts by mass of a rubber component. The sulfur in the microcapsule form preferably has a content of 1–100 mass % with respect to sulfur contained in the rubber composition. Furthermore, the softening point of the thermoplastic resin is preferably 80–270° C.

The present invention also relates to a method of manufacturing a golf ball having a solid core and a cover surrounding the solid core, characterized in that manufacture of the solid core includes the steps of:

(1) blending a microcapsule having sulfur coated with a thermoplastic resin, into a rubber composition containing a co-curing agent and an organic peroxide; and (2) heating the rubber composition to a temperature equal to or below a softening point of the thermoplastic resin for crosslinking.

According to the present invention, the sulfur is partially or entirely encapsulated with a film material of a thermoplastic resin and uniformly dispersed in the rubber composition. Due to heat generated during a crosslinking reaction, the temperature of the solid core's center portion rises to at least the softening point of the film material. If the temperature at the solid core's surface portion is kept below the softening point of the film material, the micro-encapsulated sulfur is released from the capsule exclusively at the center portion of the ball, to contribute to the crosslinking reaction, whereas the non-micro-encapsulated sulfur contributes to the crosslinking reaction across the entire solid core. In the solid core crosslinked by sulfur, the solid core's center portion has lower hardness compared to the solid core's surface portion. According to the present invention, a larger hardness difference between the solid core's center portion and surface portion is provided, compared to the case in which sulfur is not micro-encapsulated. In other words, by reducing the solid core's center hardness without reducing the solid core's surface hardness, it is possible to provide a golf ball with favorable rebound and flight performances without impairing the durability.

The foregoing and other objects, features, aspects and advantages of the present invention will become more apparent from the following detailed description of the present invention.

DESCRIPTION OF THE PREFERRED EMBODIMENTS

According to the present invention, a golf ball is manufactured by blending sulfur coated with a thermoplastic resin to be micro-encapsulated, into a rubber composition, thereafter molding the rubber composition into a solid core, and surrounding the solid core with a cover. The present invention can also be adopted for, for example, a two-piece golf ball made of two layers having a core and a cover, a multi-piece golf ball having an intermediate layer between a core and a cover, and a thread-wound golf ball having a core of the type in which rubber thread is wound around a solid core. The solid core may be a single-layered structure or a multi-layered core having at least two layers.

For a rubber component used for the rubber composition in the solid core, diene rubber of either natural rubber or synthetic rubber may be used, where a rubber component containing polybutadiene rubber is preferably used. In particular, high cis polybutadiene rubber with a cis-1,4 structure content of preferably at least 40%, more preferably at least 90%, is preferably used. It is also possible to blend natural rubber (NR), polyisoprene rubber (IR), styrene-butadiene rubber (SBR), ethylene-propylene-diene terpolymer (EPDM), or other types of diene rubber into the polybutadiene rubber.

According to the present invention, sulfur coated with a thermoplastic resin to be micro-encapsulated is blended into the rubber composition of the solid core. The sulfur is blended as a crosslinker to form crosslinking structures between main chains of rubber molecules. Crosslinking by sulfur can provide a rubber composition with high flexibility and relatively low rubber hardness.

In order to improve rebound performance, which contributes to flight performance of a golf ball, it is desirable that the solid core's center hardness is lower than the solid core's surface hardness, and that the solid core's center hardness greatly differs from the solid core's surface hardness. Furthermore, in order to ensure durability, it is necessary to keep the solid core's surface hardness at or above a certain level. According to the present invention, by containing sulfur micro-encapsulated with a thermoplastic resin in the rubber composition of the solid core, a crosslink density is controlled using a temperature distribution during molding of the solid core to adjust the balance between the solid core's center hardness and surface hardness.

The micro-encapsulated sulfur disperses in the rubber composition and acts as a crosslinker exclusively at a temperature equal to or above the softening point (melting temperature) of a thermoplastic resin, that is, the film material of the microcapsule. Therefore, the crosslinking reaction can be controlled by adjusting the temperature of the rubber composition. In other words, if the temperature of the solid core's center portion is at or above the softening point of the film material and the temperature of the solid core's surface portion is below the softening point thereof, then the micro-encapsulated sulfur acts as the crosslinker exclusively at the solid core's center portion. As a result, the solid core's center portion contains more crosslinking structures formed by the sulfur than the solid core's surface portion. If any other crosslinker is used in combination with the sulfur, relatively inflexible crosslinking structures formed by the crosslinker other than sulfur ensures at least a certain level of hardness at the solid core's surface portion, and only the hardness of the solid core's center portion containing many crosslinking structures formed by the sulfur is reduced to fall within a desired range. As a result, a rubber composition providing both favorable durability and rebound performance is obtained.

The content of micro-encapsultaed sulfur is preferably 0.01–10 parts by mass, more preferably 0.05–10 parts by mass, still more preferably 0.2–10 parts by mass, and particularly 0.5–10 parts by mass with respect to 100 parts by mass of the rubber component. If it is at least 0.01 parts by mass, a sufficient difference between the solid core's center hardness and the solid core's surface hardness can be obtained, and favorable durability is also provided. If it is not more than 10 parts by mass, delayed sulfur vulcanization is prevented and sufficient hardness is provided with the rubber composition, resulting in favorable rebound performance.

The ratio of the micro-encapsulated sulfur with respect to the total blended sulfur is preferably 1–100 mass %, more preferably 5–100 mass %, and still more preferably 10–100 mass %. The ratio of at least 1 mass % is preferable because a crosslink density is effectively controlled by the micro-encapsulation.

The content of the non-micro-encapsulated sulfur is preferably not more than 0.5 parts by mass, more preferably not more than 0.3 parts by mass, and still more preferably not more than 0.1 parts by mass with respect to 100 parts by mass of the rubber component. If it is not more than 0.5 parts by mass, excess decrease in the solid core's hardness, particularly the solid core's surface hardness is prevented, resulting in favorable rebound performance.

The sulfur is micro-encapsulated using a thermoplastic resin as a film material. The softening point of the film material is preferably in the range of 80–270° C., more preferably 100–260° C., and still more preferably 120–250° C. If it is at least 80° C., microcapsules are less likely to be broken during kneading of the rubber component. If it is equal to or below 270° C., the film material melts at a normal crosslinking temperature of the rubber composition, providing an ability to prevent deterioration of the rubber component and release the sulfur from the microcapsule.

The thermoplastic resin for use as the film material is selected to have a desired softening point depending on the rubber composition's vulcanizing temperature. For the thermoplastic resin, it is possible to use polystyrene, polyethylene, polypropylene, polyurethane, nylon resin, acrylic resin, methacrylic resin, ethylene-acryl copolymer, ethylene-vinyl acetate copolymer, butadiene resin, butene resin, polycarbonate, ABS resin, AS resin, and the like.

As a method of coating the sulfur with a thermoplastic resin to form a microcapsule, any of the known methods for micro-encapsulation is adopted. For example, in an air-suspension method, a core material (powder) is fluidized by an airflow and suspended in the air, and an emulsion with a thermoplastic resin as the film material emulsified is sprayed onto the surface of the suspended particle. The suspended air is then heated to vaporize the solvent, so that a capsule film can be formed. Alternatively, in a spray drying method, a core material is suspended in an emulsion with a thermoplastic resin as the film material emulsified therein, and the suspension is sprayed to form fine particles, which are instantaneously dried, and thus a capsule film can be formed. Alternatively, other methods, such as a method of encapsulating a powder particle with another one under a dry condition (i.e. a method in which particles of a core material and finer particles of a film material are mixed together and then an impact is applied by centrifugal force, for example, to embed the film material into the surface of the core material for encapsulation) can be adopted. From the viewpoint of the strength of microcapsule film, the method of encapsulating a powder particle with another one under a dry condition is preferable.

In the microcapsule obtained from the above-described method, the content of sulfur is preferably 70–95 mass %. If it is at least 70 mass %, a sufficient amount of sulfur is released. If it is not more than 95 mass %, homogeneous microcapsules can be made.

A crosslinking reaction of the solid core according to the present invention is conducted, for example, at a temperature of 140–180° C., preferably at 150–170° C., for 10–60 minutes. The relation between the heating temperature (A) during vulcanization and the softening point (B) of the thermoplastic resin as a film material is set such that (A−B) preferably falls in the range of −50 to 0° C., more preferably −40 to 0° C., and still more preferably −10 to 0° C. Note that the heating temperature refers to a surface temperature of a mold during vulcanization.

If non-micro-encapsulated sulfur or any other crosslinker is used in combination with the micro-encapsulated sulfur, a crosslinking reaction proceeds across the solid core, generating a heat. At this stage, since the temperature of the solid core's center portion exceeds that of the surface portion owing to heat accumulation, even in the case of (A<B), (A>B) may occur at the solid core's center portion. In this case, since the film material of the microcapsules melts at the solid core's center portion to release the sulfur therefrom, the crosslinking reaction is further accelerated. As a result, the solid core's center portion has a higher ratio of the crosslinking structures formed by the sulfur compared to the solid core's surface portion, and thus has a lower hardness compared to the solid core's surface portion. If (A–B) is equal to 0° C., the film material of the microcapsules gradually melts to release sulfur. When the crosslinking reaction starts, the temperature of the solid core's center portion particularly rises, and a large amount of sulfur is further released from the microcapsules. Accordingly, the solid core's center portion has a higher ratio of the crosslinking structures formed by the sulfur and thus has a lower hardness compared to the solid core's surface portion.

If the crosslinking reaction is expected at 140–180° C., for example, it is preferred to use, as a film material, a thermoplastic resin such as polypropylene, whose softening point is approximately 140–180° C. Since the crosslinking reaction is exothermic, the crosslinking temperature becomes higher than the heating temperature of the mold. Therefore, it is preferred to control the crosslinking temperature according to an actual measurement value inside the solid core.

A softening point of the thermoplastic resin is measured using a thermal mechanical analyzer (TMA). More particularly, a measuring stylus under load is rested to face a sample of the thermoplastic resin in a plate form, and the sample is heated at a predetermined heating rate of 5° C./min, for example, and the temperature at which the measuring stylus penetrates into the sample is obtained as the softening point.

It is possible to use, as the co-curing agent, $\alpha,\beta$-unsaturated carboxylic acid with a carbon number of 3–8, a metal salt thereof, or the like, in the rubber composition of the solid core according to the present invention. Examples of the $\alpha,\beta$-unsaturated carboxylic acid include acrylic acid, methacrylic acid, maleic acid, fumaric acid and the like, where acrylic acid and methacrylic acid are particularly suitable for the purpose of improving rebound performance of the rubber composition. Examples of the above-described metal salt include zinc salt, sodium salt, magnesium salt, calcium salt, aluminum salt and the like, where zinc salt is particularly preferable.

The blended amount of the co-curing agent is preferably in the range of 10–50 parts by mass, more preferably 10–45 parts by mass, and still more preferably 15–45 parts by mass with respect to 100 parts by mass of the rubber component. If it is at least 10 parts by mass, the rubber composition can attain a sufficient crosslink density, resulting in favorable rebound performance and durability. If it is not more than 50 parts by mass, degradation of the rebound performance due to graft polymerization of the co-curing agent to main chains of rubber molecules can be prevented, resulting in favorable feeling.

An organic sulfur compound may further be blended to the rubber composition of the solid core. For example, it is possible to use, as the organic sulfur compound, thiurams such as tetramethylthiuram disulfide, tetrabutylthiuram disulfide, and dipentamethylenethiuram tetrasulfide; sulfides such as molpholine disulfide, alkylphenol disulfide, diphenyl monosulfide, diphenyl disulfide, diphenyl polysulfide, dipentachloro diphenyl disulfide, and dixylyl disulfide; thiophenols such as pentachlorothiophenol, 4-t-butyl thiophenol, and 2-benzamide thiophenol; thiocarboxylic acids such as thiobenzoic acid; dithioic acid salts; and others. The blended amount of the organic sulfur compound is preferably in the range of 0.1–5 parts by mass, more preferably 0.2–3 parts by mass, and still more preferably 0.2–2 parts by mass with respect to 100 parts by mass of the rubber component. By blending the organic sulfur compound, higher rebound performance and favorable hit feeling with smaller impact can simultaneously be attained.

To the rubber composition, it is possible to further add, as a crosslinking initiator, 0.1–5 parts by mass, preferably 0.3–3.5 parts by mass, and still more preferably 0.5–2.5 parts by mass of an organic peroxide with respect to 100 parts by mass of the rubber component. Preferable examples of the organic peroxide include dicumyl peroxide, 1,1-bis (t-butyl peroxy)-3,3,5-trimethyl cyclohexane, 2,5-dimethyl-2,5-di(t-butyl peroxy) hexane, di-t-butyl peroxide, di-t-amyl peroxide, t-butyl cumyl peroxide, $\alpha$, $\alpha'$-bis(t-butyl peroxy) diiso propyl benzene, n-butyl-4,4-bis(t-butyl peroxy) valerate, and the like.

In addition, metal powder of high specific gravity, such as tungsten powder or molybdenum powder, metal salt such as zinc oxide, barium sulfate or calcium carbonate, and others may be added to the rubber composition of the solid core as a filler, which is mainly used to adjust specific gravity. An additive such as an antioxidant may also be added where appropriate.

The solid core is preferably adjusted such that the amount of deformation under loads from an initial load of 98N to a final load of 1274N falls in the range of 2.0–10.0 mm, more preferably 3.0–9.0 mm, and still more preferably 3.5–7.0 mm. If it is at least 2.0 mm, the solid core has appropriate softness, resulting in favorable hit feeling. If it is not more than 10.0 mm, the solid core has hardness at or above a certain level, resulting in sufficient rebound performance and durability.

The outside diameter of the solid core is preferably in the range of 10–42 mm, more preferably 20–41 mm, and still more preferably 30–40 mm. If it is at least 10 mm, performance of the solid core can be reflected to the ball performance. If it is not more than 42 mm, a cover with sufficient thickness can be formed, which makes molding of the ball easy, and also provides favorable durability of the ball.

Surface hardness of the solid core is preferably in the range of 60–90, more preferably 65–85 in JIS-C hardness. If it is at least 60, sufficient hardness is obtained, resulting in favorable rebound performance and durability. If it is not more than 90, appropriate softness is obtained, resulting in favorable hit feeling and durability.

Center hardness of the solid core is preferably less than 55, more preferably in the range of 25–55, and still more preferably 25–45 in JIS-C hardness. If it is less than 55, favorable hit feeling can be obtained.

(The solid core's surface hardness the solid core's center hardness) is preferably at least 25, more preferably in the range of 25–50, and still more preferably 30–50 in JIS-C hardness. If it is at least 25, a sufficient amount of deformation is obtained, resulting in favorable hit feeling and distance (total).

A volume of the solid core according to the present invention is preferably in the range of 30–90%, more preferably 50–85%, and still more preferably 60–80% of the total volume of the golf ball. If it is at least 30%, the effects of the present invention can sufficiently be reflected to the ball performance. If it is not more than 90%, sufficient cover thickness can be assured, resulting in favorable durability.

The golf ball according to the present invention is manufactured by surrounding the solid core with a cover. Various types of compositions conventionally known can be used for the cover composition, and from the viewpoint of improving durability and rebound performance, a polymer component mainly composed of a thermoplastic resin and/or a thermoplastic elastomer is preferably used. For the cover composition, it is possible to use one of, or a mixture including at least two of, ionomer resin, polyethylene resin, polypropylene resin, polyester thermoplastic elastomer, polyamid thermoplastic elastomer, polyurethane thermoplastic elastomer, polystyrene thermoplastic elastomer, trans 1,4-polyisoprene and the like. Particularly, if a blended amount of ionomer resin is at least 50 mass %, preferably at least 70 mass % in the cover composition, durability and rebound performance will be improved.

Herein, the trans 1,4-polyisoprene refers to one having a trans structure content of at least 60% in a polymer molecule. One having a trans structure content of at least 60% has a larger crystalline region and a softening point at or above a certain level, which satisfies the basic properties of the cover.

Examples of the ionomer resin include: a copolymer of α-olefin and α,β-unsaturated carboxylic acid with a carbon number of 3–8, having at least a portion of carboxyl group therein neutralized by a metal ion; a terpolymer of α-olefin, α,β-unsaturated carboxylic acid with a carbon number of 3–8, and α,β-unsaturated carboxylic acid ester with a carbon number of 2–22, having at least a portion of carboxyl group therein neutralized by a metal ion; and others. As the α-olefin above, ethylene, propylene, 1-butene, 1-pentene or the like is used, where ethylene is particularly preferable. As the α,β-unsaturated carboxylic acid with a carbon number of 3–8, acrylic acid, methacrylic acid, fumaric acid, maleic acid, crotonic acid or the like is used, where acrylic acid and methacrylic acid are particularly preferable. As the α,β-unsaturated carboxylic acid ester with a carbon number of 2–22, methyl, ethyl, propyl, n-butyl, isobutyl ester or the like of acrylic acid, methacrylic acid, fumaric acid, maleic acid or the like is used, wherein acrylic ester and methacrylic ester are particularly preferable.

For the metal ion which neutralizes at least a portion of the carboxyl group within the copolymer of α-olefin and α,β-unsaturated carboxylic acid with a carbon number of 3–8, or the terpolymer of α-olefin, α,β-unsaturated carboxylic acid with a carbon number of 3–8, and α,β-unsaturated carboxylic acid ester with a carbon number of 2–22 described above, sodium ion, lithium ion, zinc ion, magnesium ion, potassium ion or the like may be used.

In the cover, fiber-reinforced rubber, fiber-reinforced resin, specific gravity regulator, metal powder, metal oxide, colorant, fluorescent brightening agent, lubricant and others may also be blended where appropriate in addition to the component described above.

The thickness of the cover is preferably in the range of 0.3–6.0 mm, more preferably in the range of 0.4–3.0 mm, and still more preferably in the range of 0.5–1.5 mm. If it is at least 0.3 mm, sufficient strength and durability of the cover can be obtained. If it is not more than 6.0 mm, an excess increase in volume ratio of the cover component with respect to the total volume of the ball is prevented, and favorable rebound performance of the ball is obtained, and accordingly, the performance of the solid core according to the present invention can sufficiently be reflected to the ball performance. For the cover, a single layered one or a multi-layered one having at least two layers may be used.

By using the materials above, a golf ball can be manufactured in a method usually used. For example, the rubber composition containing the micro-encapsulated organic peroxide is first kneaded with a roll, kneader, Banbury mixer or the like. The same is put into a mold and vulcanized under pressure at 120° C.–180° C., preferably 150° C.–170° C., for 10 minutes to 60 minutes to form a solid core. During the process, in order to achieve large temperature difference between the solid core's center portion and surface portion, it is desirable that the vulcanization is conducted at a temperature as high as possible within the range acceptable to the properties of the blend component so as to prompt the crosslinking reaction. For example, if dicumyl peroxide is used as a crosslinking initiator, a vulcanizing temperature is preferably set to at least 160° C.

In order to improve cohesion between the solid core and the cover, an adhesive may be applied to the surface of the solid core obtained, or the surface may be roughened. Alternatively, another intermediate layer may be formed outside the solid core using a method of injection molding, for example.

The solid core is then surrounded with a cover, using a method in which the solid core is surrounded with two of half shells made of the molded cover composition and then press-molded at 130–170° C. for 1–5 minutes, a method in which kneaded cover composition is directly injection-molded onto the solid core under the condition, for example, at the temperature of 200–250° C. and the pressure of 3–7 Mpa, and other methods. Finally, the paint is applied where appropriate, for example, to finish the golf ball.

EXAMPLES (1) Manufacture of Microcapsules 5 g of polypropylene (softening point: 160° C.) was dissolved into 50 ml of trichlorobenzene, to which a 20 wt % water solution of sulfur was added in an amount of 100 g, and stirred for 30 minutes for emulsification. The emulsification state was in the form of (W/O) type emulsion. Next, 1 liter of 4 wt % PVA water solution was prepared, to which the obtained emulsion was added while stirring, so that a [(W/O)/W] type complex emulsion was obtained. The system was gradually heated to 40° C. to vaporize trichlorobenzen. Thereafter, the system was stirred at 55° C. for an hour to cure the film material, so that a microcapsule was obtained. The sulfur content within the microcapsule was 80 mass %.

(2) Production of Solid Core

The rubber composition shown in Table 1 was kneaded using a kneader and roll, and subjected to thermal-press-molding at 160° C. for 20 minutes so that a solid core having a core diameter shown in Table 1 was produced. The temperature of the rubber composition during kneading was controlled such that the temperature would not exceed 100° C.

TABLE 1

|  |  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|---|
| Core | Blend | Polybutadiene rubber[Note 1] | 100 | 100 | 100 | 100 | 100 | 100 | 100 |
|  |  | Zinc acrylate[Note 2] | 31 | 35 | 30 | 33 | 31 | 30 | 27 |
|  |  | Zinc oxide[Note 3] | 10 | 10 | 10 | 10 | 10 | 10 | 10 |
|  |  | Barium sulfate[Note 4] | Proper amount | Proper amount | Proper amount | Proper amount | Proper amount | Proper amount | Proper amount |

TABLE 1-continued

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
|  | Organic sulfur compound(Note 5) | 0.5 | 0.5 | 0.5 | — | 0.5 | 0.5 | 0.5 |
|  | Dicumyl peroxide(Note 6) | 1 | 1 | 1 | 1 | 1 | 1 | 2 |
|  | Sulfur(Note 7) | 0.05 | — | 0.1 | — | 0.05 | 0.4 | — |
|  | Capsulated sulfur | 0.2 | 0.4 | 0.3 | 0.8 | — | — | — |
|  | Capsulated sulfur/ total sulfur (mass %) | 76.2 | 100 | 70.6 | 100 | — | — | — |
|  | Core diameter (mm) | 39.6 | 39.6 | 36.4 | 39.6 | 39.6 | 36.4 | 39.6 |
|  | Core's amount of deformation by compression (mm) | 3.9 | 3.6 | 4.5 | 3.3 | 3.7 | 6.0 | 3.8 |
|  | Core's center hardness | 42 | 40 | 38 | 36 | 51 | 38 | 55 |
|  | Core's surface hardness | 79 | 82 | 77 | 83 | 79 | 52 | 80 |
|  | Core's hardness difference | 37 | 42 | 39 | 47 | 28 | 14 | 25 |
| Cover | Hardness of inner layer cover | — | — | 75 | — | — | 75 | — |
|  | Thickness of inner layer cover (mm) | — | — | 1.6 | — | — | 1.6 | — |
|  | Hardness of outer layer cover | 93 | 93 | 93 | 93 | 93 | 93 | 93 |
|  | Thickness of outer layer cover (mm) | 1.6 | 1.6 | 1.6 | 1.6 | 1.6 | 1.6 | 1.6 |
| Performance | Rebound performance | 1.00 | 1.01 | 1.02 | 1.00 | 1.00 | 0.95 | 0.98 |
|  | Durability | 110 | 115 | 120 | 125 | 100 | 90 | 98 |
|  | Distance (total) (m) | 178 | 179 | 180 | 178 | 176 | 172 | 175 |

(Note 1) polybutadiene rubber was "BR-11" available from JSR Corporation, having a cis-1, 4 structure content of 96%.
(Note 2) zinc acrylate was "ZNDA-90S" available from Nippon Shokubai Co., Ltd.
(Note 3) zinc oxide was available from Toho Zinc Co., Ltd.
(Note 4) barium sulfate was "Barite #100" available from Sakai Chemical Co., Ltd.
(Note 5) organic sulfur compound was diphenyl disulfide available from SUMITOMO SEIKA CHEMICALS CO., LTD.
(Note 6) dicumyl peroxide was "Percumyl D" available from NOF Corporation.
(Note 7) sulfur was " 'GOLDEN FLOWER' SULFUR POWDER" available from Tsurumi Chemical Industrial Co. Ltd.

(3) Manufacture of Cover Composition and Golf Ball

The cover composition shown in Table 2 was injection-molded on the solid core obtained to have a thickness shown in Table 1. Clear paint made of urethane was then applied thereon.

TABLE 2

|  |  | Outer layer cover | Inner layer cover |
|---|---|---|---|
| Blended component | Hi-milan 1605(Note 8) | 60 | 40 |
|  | Hi-milan 1706(Note 9) | 40 | 30 |
|  | Rabalon SR04(Note 10) | — | 30 |
|  | Titanium oxide(Note 11) | 2 | 2 |
|  | Barium sulfate | 2 | 2 |
|  | JIS-C hardness | 93 | 75 |

(Note 8) "Hi-milan 1605" was an ionomer neutralized with sodium, available from DuPont-Mitsui Polychemical Co., Ltd.
(Note 9) "Hi-milan 1706" was an ionomer neutralized with zinc, available from Dupont-Mitsui Polychemical Co., Ltd.
(Note 10) "Rabalon SR04" was an SEBS polymer alloy available from Mitsubishi Chemical Corporation.
(Note 11) titanium oxide was "A-220" available from Ishihara Sangyou Kaisha Ltd.

(4) Hardness of Solid Core

According to JIS-K6301, the solid core's center hardness and surface hardness were measured with a spring-type hardness tester (type C). The solid core's center hardness was measured at a cut surface of a hemisphere obtained by dividing the solid core in half. The results were shown in Table 1.

(5) JIS-C Hardness of Cover Composition

According to JIS-K6301, hardness of the cover composition was measured with the spring-type hardness tester (type C). The results were shown in Table 2.

(6) Cover Hardness

A thermal-press-molded sheet made of the cover composition with a thickness of approximate 2 mm was preserved at 23° C. for 2 weeks. Afterwards, three of the molded sheets were stacked, and cover hardness was measured using the spring-type hardness tester (type C) according to JIS-K6301. The results were shown in Table 1.

(7) Amount of Deformation of Solid Core by Compression

An amount of deformation of the solid core under loads from an initial load of 98N to a final load 1274N was measured. The results were shown in Table 1.

(8) Coefficient of Restitution of Ball

A circular column made of aluminum with a weight of 200 g was struck forward at an initial rate of 40 m/s. By using the propelling rate of the golf ball at the time when the column collided against the same, coefficient of restitution thereof was determined. Measurement was conducted using 12 balls in each example and comparative example to calculate the mean value. The numbers were shown as relative values to Comparative Example 1, which was set to 1.00. The results were shown in Table 1.

(9) Durability of Ball

A W#1 driver with a metal head was attached to a swing robot available from True Temper Sports. A ball was then struck at a head speed set to 45 m/s against a collision plate. The ball was repeatedly struck and the number of strikes with which the ball was broken was measured. The numbers were shown as relative values to Comparative Example 1, which was set to 100. The results were shown in Table 1.

(10) Distance (total)

A Wood (XXIOR: 11°) #1 club (driver) with a metal head was attached to a swing robot available from True Temper Sports. A golf ball was struck at a head speed of 40 m/s. The distance till the point where it came to rest after landing was measured as distance (total). Measurement was conducted using 12 balls in each example and comparative example to calculate the mean value. The results were shown in Table 1.

Examples 1–4, in which micro-encapsulated sulfur is blended, provide highly improved durability and distance (total) without impairing coefficient of restitution, compared to Comparative Examples 1 and 2 containing only non-micro-encapsulated sulfur. These results show that the golf ball in accordance with the present invention has sufficient durability and at the same time excellent rebound performance and distance (total).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball comprising a solid core and a cover surrounding said solid core, said solid core being composed of a vulcanizate of a rubber composition containing a microcapsule having sulfur coated with a thermoplastic resin.

2. The golf ball according to claim 1, wherein the sulfur in the microcapsule form in the rubber composition has a content of 0.01–10 parts by mass with respect to 100 parts by mass of a rubber component.

3. The golf ball according to claim 1, wherein the sulfur in the microcapsule form has a content of 1–100 mass % with respect to sulfur contained in the rubber composition.

4. The golf ball according to claim 1, wherein a softening point of the thermoplastic resin is 80–270° C.

5. A method of manufacturing a golf ball having a solid core and a cover surrounding said solid core, manufacture of said solid core including the steps of:
   (1) blending a microcapsule having sulfur coated with a thermoplastic resin, into a rubber composition containing a co-curing agent and an organic peroxide; and
   (2) heating said rubber composition to a temperature equal to or below a softening point of said thermoplastic resin for crosslinking.

6. The golf ball according to claim 1, wherein a content of the sulfur in the microcapsule is 70–95 mass %.

7. The golf ball according to claim 1, wherein the differential of the surface hardness of the core (a) and the center hardness of the core (b) ((a) minus (b)) is at least 25 in JIS-C hardness.

8. The method according to claim 5, wherein a temperature at the center portion of the solid core is higher than the softening point of said thermoplastic during said crosslinking.

9. The golf ball according to claim 4, wherein a content of the sulfur in the microcapsule is 70–95 mass %.

10. The golf ball according to claim 9, wherein the differential of the surface hardness of the core (a) and the center hardness of the core (b) ((a) minus (b)) is at least 25 in JIS-C hardness.

* * * * *